United States Patent
Tsuruta et al.

(10) Patent No.: US 10,933,974 B2
(45) Date of Patent: Mar. 2, 2021

(54) MORPHABLE BODY WITH SHAPE MEMORY MATERIAL MEMBERS

(71) Applicant: Toyota Motor Engineering & Manufacturing North America, Inc., Plano, TX (US)

(72) Inventors: Ryohei Tsuruta, Ann Arbor, MI (US); Taewoo Nam, Ann Arbor, MI (US); Eric Smith, Northville, MI (US); Umesh N. Gandhi, Farmington Hills, MI (US); Deborah Bumgardner, Garden City, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 4 days.

(21) Appl. No.: 16/396,872

(22) Filed: Apr. 29, 2019

(65) Prior Publication Data
US 2020/0339242 A1    Oct. 29, 2020

(51) Int. Cl.
*B64C 3/38* (2006.01)
*F03G 7/06* (2006.01)
*B64C 3/54* (2006.01)

(52) U.S. Cl.
CPC ............. *B64C 3/38* (2013.01); *F03G 7/065* (2013.01); *B64C 2003/543* (2013.01)

(58) Field of Classification Search
CPC ...... B64C 3/38; B64C 2003/543; F03G 7/065
(Continued)

(56) References Cited

U.S. PATENT DOCUMENTS 4,244,140 A * 1/1981 Kim ............... A63H 33/26
446/14
5,686,003 A    11/1997 Ingram et al.
(Continued)

FOREIGN PATENT DOCUMENTS

CN    101367433 B    8/2010
EP    1420094 A1    5/2004
(Continued)

OTHER PUBLICATIONS

Barbarino et al., "A review on shape memory alloys with applications to morphing aircraft", Smart Materials and Structures, Apr. 2014 (20 pages).

*Primary Examiner* — Hoang M Nguyen
(74) *Attorney, Agent, or Firm* — Christopher G. Darrow; Darrow Mustafa PC (57) ABSTRACT

A body can be configured to be selectively morphable. The body can be at least partially hollow. The body can include a surface. A shape memory material member, such as a shape memory alloy wire, can extend along the surface. The shape memory material member can include a first region, a second region, and a central region located between the first region and the second region. The first and second regions of the shape memory material member can be constrained on the surface, such as by stitches. The central region of the shape memory material member can be unconstrained on the surface. When activated, the shape memory material member can contact, causing the body to bend in the central region due being constrained in the first and second regions. Thus, the body can be morphed into an activated configuration.

19 Claims, 6 Drawing Sheets

(58) Field of Classification Search
USPC .............................. 60/527–529; 310/306–309
See application file for complete search history.

(56) References Cited

U.S. PATENT DOCUMENTS

| | | | |
|---|---|---|---|
| 6,773,535 B1 | 8/2004 | Wetzel | |
| 7,306,187 B2 | 12/2007 | Lavan | |
| 7,484,735 B2 | 2/2009 | Verbrugge et al. | |
| 7,878,459 B2 | 2/2011 | Mabe et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 8,240,677 B2 | 8/2012 | Browne et al. | |
| 9,068,561 B2* | 6/2015 | Gondo | F03G 7/065 |
| 9,267,495 B2* | 2/2016 | Kopfer | F03G 7/065 |
| 9,664,182 B2* | 5/2017 | Nicolini | F03G 7/065 |
| 9,981,421 B2 | 5/2018 | Macroe et al. | |
| 2003/0000605 A1* | 1/2003 | Homma | F03G 7/065 148/563 |
| 2004/0256920 A1* | 12/2004 | Gummin | F03G 7/065 310/15 |
| 2005/0198904 A1 | 9/2005 | Browne et al. | |
| 2005/0206096 A1 | 9/2005 | Browne et al. | |
| 2006/0038643 A1* | 2/2006 | Xu | F03G 7/065 335/78 |
| 2006/0038745 A1 | 2/2006 | Naksen et al. | |
| 2007/0205853 A1 | 9/2007 | Taya et al. | |
| 2007/0246898 A1 | 10/2007 | Keefe et al. | |
| 2009/0283643 A1 | 11/2009 | Sar et al. | |
| 2011/0030380 A1 | 2/2011 | Widdle, Jr. et al. | |
| 2011/0217031 A1* | 9/2011 | Eromaki | F03G 7/06 396/133 |
| 2011/0300358 A1 | 12/2011 | Blohowiak et al. | |
| 2012/0276807 A1* | 11/2012 | Cabrera | A63H 3/08 446/352 |
| 2012/0292155 A1 | 11/2012 | Gunter | |
| 2017/0174236 A1* | 6/2017 | Worden | B61L 3/16 |

FOREIGN PATENT DOCUMENTS

| | | |
|---|---|---|
| JP | 2006248456 A | 9/2006 |
| KR | 20050056526 A | 6/2005 |
| WO | 2017077541 A1 | 5/2017 |

* cited by examiner

MORPHABLE BODY WITH SHAPE MEMORY MATERIAL MEMBERS

FIELD

The subject matter described herein generally relates to vehicle structures and, more particularly, to selectively morphable vehicle structures.

BACKGROUND

Weight is a consideration in the design of aircraft, such as airplanes and helicopters. As aircraft weight is directly proportional to the amount of force required to achieve and maintain flight, there are ongoing efforts to reduce aircraft weight, such as by using lightweight materials. In an inflatable aircraft, the solid fuselage and wings can be exchanged for lightweight fabrics, which are inflated to achieve a general shape. The use of fabrics can reduce the overall weight of the aircraft and allows for lift while using less power. Several aircraft components are movable by mechanisms such as actuators, gears, or other mechanical systems.

SUMMARY

In one respect, the present disclosure is directed to a morphable structure. The morphable structure can include a body. At least a portion of the body can be hollow. The body can include a surface. The morphable structure can include a shape memory material member. The shape memory material member can extend along the surface. The shape memory material member can include a first region and a second region. The shape memory material member can include a central region located between the first region and the second region. The first region and in the second region of the shape memory material member can be constrained on the surface. The central region of the shape memory material member can be unconstrained on the surface. When activated, the shape memory material member can cause the body to bend in the central region. Thus, the body can be morphed into an activated configuration.

In another respect, the present disclosure is directed to a system for morphing a body. The system can include a body. The body can include a surface. The system can include a shape memory material member. The shape memory material member can extend along the surface. The shape memory material member can include a first region and a second region. The shape memory material member can include a central region located between the first region and the second region. The first region and the second region of the shape memory material member can be constrained on the surface by stitches. The central region of the shape memory material member can be unconstrained on the surface. The system can include one or more power sources operatively connected to the shape memory material member. The system can include one or more processors operatively connected to control a supply of electrical energy from the one or more power sources to the shape memory material member. The one or more processors being programmed to initiate executable operations. The executable operations can include determining whether a morphing condition is met. The executable operations can further include, responsive to determining that the morphing condition is met, causing electrical energy to be supplied to the shape memory material member from the one or more power sources. The shape memory material member can be activated to cause the body to bend in the central region. Thus, the body is morphed into an activated configuration.

In still another respect, the subject matter described herein is directed to a method of morphing a body. The body can include a surface. A shape memory material member can extend along the surface. The shape memory material member can include a first region and a second region. The shape memory material member can include a central region located between the first region and the second region. The first region and the second region of the shape memory material member can be constrained on the surface by stitches. The central region of the shape memory material member can be unconstrained on the surface. The method can include determining whether a morphing condition is met. The method can include, responsive to determining that the morphing condition is met, causing electrical energy to be supplied to the shape memory material member such that the shape memory material member contracts and causes the body to bend in the central region. Thus, the body can be morphed into an activated configuration.

DETAILED DESCRIPTION

The traditional mechanisms for moving aircraft components require pumps, motors, and other components can add significant weight to the aircraft. Accordingly, arrangements described herein are directed to arrangements for morphing a structure without relying on such bulky and heavy components. Arrangements described herein generally relate to the use of active materials in controlling the shape or morphology of an object. According to arrangements herein a morphable structure can include a body. The body can include a surface. The morphable structure can include a shape memory material member, such as a shape memory alloy wire. The shape memory material member can extend along the surface. The shape memory material member can be constrained in intermittent regions on the surface, such as by stitching. These constrained regions can be separated by regions in which the shape memory material member is not constrained on the surface. When the shape memory material member is activated, it can contract. However, due to the constrained regions, the contraction of the shape memory material member can cause the body to bend in the region that is not constrained. Thus, the body can be morphed into an activated configuration without the use of heavy and bulky mechanical structures.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
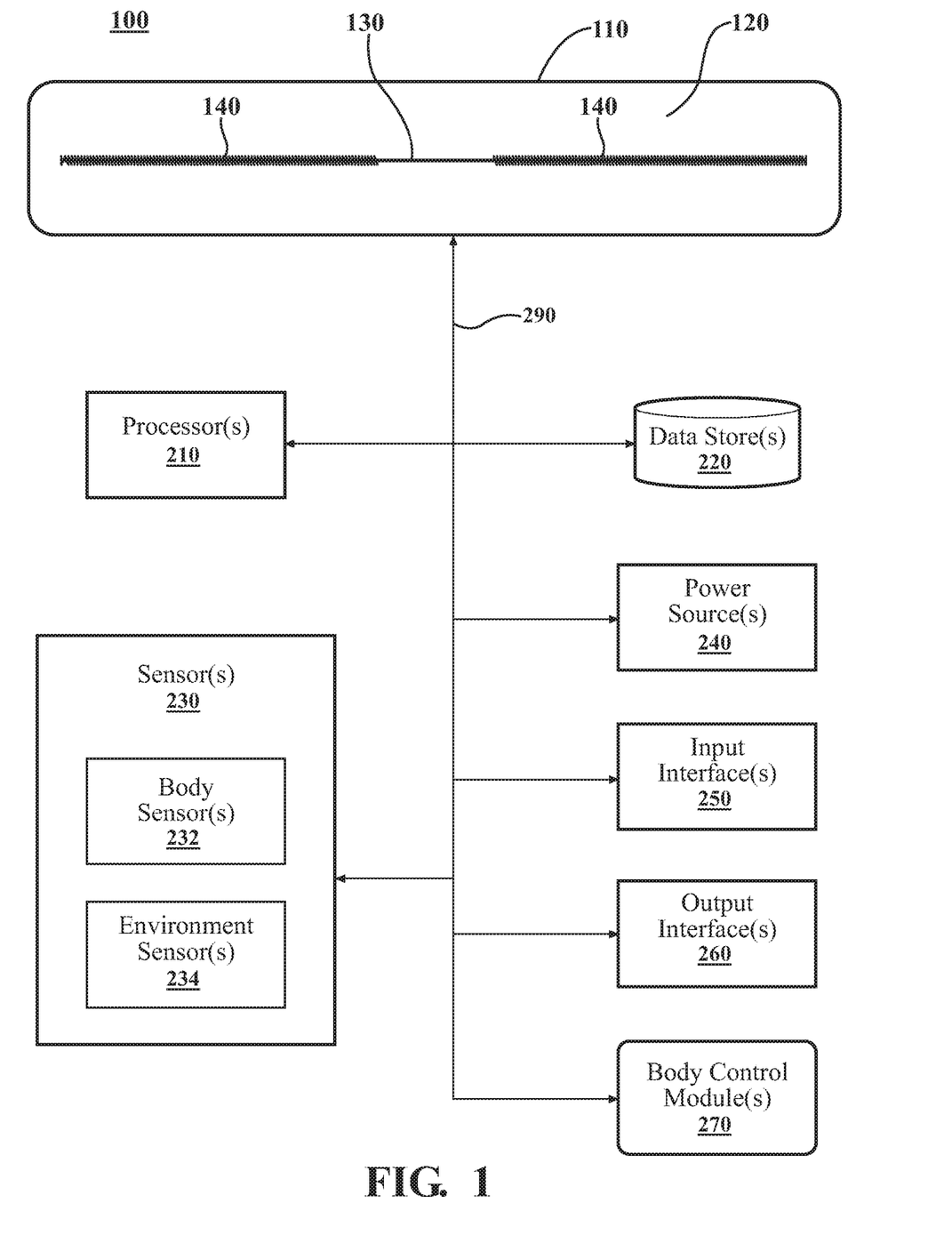
FIG. 1 is an example of a system for morphing a body.

Referring to FIG. 1, an example of a system 100 for morphing a body is shown. The system 100 can include various elements. Some of the possible elements of the system 100 are shown in FIG. 1 and will now be described. It will be understood that it is not necessary for the system 100 to have all of the elements shown in FIG. 1 or described herein. The system 100 can have any combination of the various elements shown in FIG. 1. Further, the system 100 can have additional elements to those shown in FIG. 1. In some arrangements, the system 100 may not include one or more of the elements shown in FIG. 1. Further, while the various elements may be shown as being located on or within the system 100 in FIG. 1, it will be understood that one or more of these elements can be located external to the system 100. Thus, such elements are not located on, within, or otherwise carried by the system 100. Further, the elements shown may be physically separated by large distances. Indeed, one or more of the elements can be located remote from the other elements of the system 100.

The system 100 can include a body 110, one or more processors 210, one or more data stores 220, one or more sensors 230, one or more power sources 240, one or more input interfaces 250, one or more output interfaces 260, and one or more body control modules 270. Each of these elements will be described in turn below.

The system 100 can include a body 110. The body 110 can be made of any suitable material. For instance, in some arrangements, the body 110 can be made of a flexible, pliable, and/or compliant material. In one or more arrangements, the body 110 can be made of plastic, fabric, woven fabric, elastomer, shape-memory polymer (SMP), SMP composites, other pliable materials, or combinations thereof. In one or more arrangements, the body 110 can be made of a stitchable material, that is, a material that can be stitched and maintain integrity with stitches present in the material. In some arrangements, the body 110 can be made of one or more layers. In one or more arrangements, the body 110 can be made of a plurality of pieces of material.

The body 110 can include a surface 120. The surface 120 can define at least a portion of the exterior of the body 110. Thus, the surface 120 can be an exterior surface of the body 110. In some arrangements, the surface 120 can have a surface texture and/or one or more formations for various operational purposes, such as to create lift and/or assist in controlling flight. In one or more arrangements, the surface 120 The surface layer 102 can be composed of one or more layers, formations, and or combinations of material. In some implementations, the surface layer 102 is fluidly impermeable, such that the surface layer 102 can be inflated.

Figure 2:
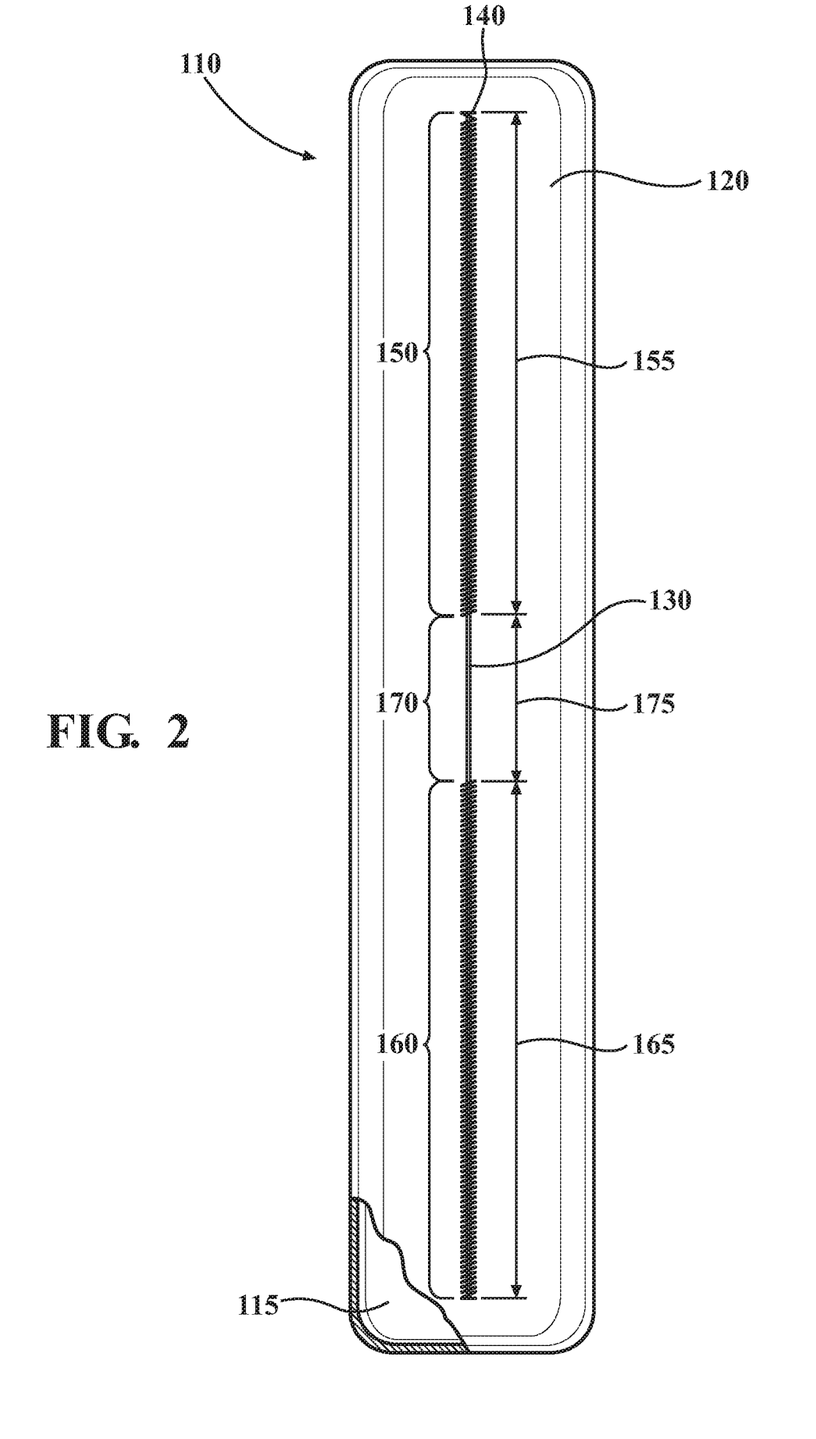
FIG. 2 is an example of a morphable body.

The body 110 can be at least partially hollow. Thus, the body 110 can have an inner chamber 115 (FIG. 2). The inner chamber 115 can be substantially sealed to retain a fluid therein. The inner chamber 115 can be substantially fluid impermeable.

In one or more arrangements, the body 110 can be configured to be inflatable. Thus, the body 110 can include one or more ports or valves to allow air or other fluid to be delivered to and/or released from an inner chamber 115 of the body 110. The inner chamber 115 can be operatively connected to a fluid source. In some arrangements, the fluid source can be configured to maintain a constant fluid pressure in the inner chamber 115. In some implementations, the fluid source can include a pump. In some arrangements, the fluid source can include a gas canister capable of delivering a compressed gas.

In one or more arrangements, the body 110 can be a portion or component of a vehicle. As used herein, "vehicle" means any form of motorized transport. For instance, the vehicle may be an automobile, a watercraft, an aircraft, a spacecraft, or any other form of motorized transport. In one or more implementations, the vehicle can be an aircraft, and the body 110 can be a wing of the aircraft. While arrangements will be described herein with respect to aircraft, it will be understood that embodiments are not limited to aircraft.

One or more shape memory material members 130 can be operatively connected to the surface 120 of the body 110. While the surface 120 is shown as being an external surface of the body 110, it will be appreciated that the shape memory material members 130 can be operatively connected to an interior surface of the body 110. Further details of the shape memory material member(s) 130 and the body 110 will be described in connection with FIG. 2 below.

As noted above, the system 100 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other. In one or more arrangements, one or more processors 210 can be a main processor(s) of the vehicle.

The system 100 can include one or more data stores 220 for storing one or more types of data. The data store(s) 220 can include volatile and/or non-volatile memory. Examples of suitable data stores 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The data store(s) 220 can be a component of the processor(s) 210, or the data store(s) 220 can be operatively connected to the processor(s) 210 for use thereby. The term "operatively connected," as used throughout this description, can include direct or indirect connections, including connections without direct physical contact.

The system 100 can include one or more sensors 230. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 100 includes a plurality of sensors 230, the sensors can work independently from each other. Alternatively, two or more of the sensors can work in combination with each other. In such case, the two or more sensors can form a sensor network. The sensor(s) 230 can be operatively connected to the processor(s) 210, the data store(s) 220, and/or other elements of the system 100 (including any of the elements shown in FIG. 1).

The sensor(s) 230 can include any suitable type of sensor. Various examples of different types of sensors will be described herein. However, it will be understood that the embodiments are not limited to the particular sensors described.

The sensor(s) 230 can include one or more body sensors 232. The body sensor(s) 232 can be configured to acquire, detect, determine, assess, monitor, measure, quantify and/or sense body data. "Body data" includes and data or information about the body 110 itself or any system or device that the body 110 is a part of, such as a vehicle. Such data or information can include, for example, position, orientation, speed, weight, temperature, pressure, stress, and/or strain, just to name a few possibilities. In one or more arrangements, the body sensors 232 can include one or more speedometers, weight sensors, pressure sensors, position and/or displacement sensors, level sensors, force sensors, torque sensors, gyroscopes, accelerometers, an inertial measurement unit (IMU), a dead-reckoning system, a global navigation satellite system (GNSS), a global positioning system (GPS), radio compass (NDB), altitude sensors, thermocouples (external and internal), Angle-of-Attack (AoA) sensors, altimeter sensors, cabin air pressure sensors, cargo air pressure, fuel temperature/pressure/flow sensors, hydraulic pressure sensors, weight sensors, voltmeters, Doppler radar, downdraft sensors, and/or other suitable sensors. The body sensors 232 can be any type of sensor, now known or later developed.

The sensor(s) 230 can include one or more environment sensors 234. The environment sensor(s) 234 can be configured to acquire, detect, determine, assess, monitor, measure, quantify, acquire, and/or sense environment data. "Environment data" includes and data or information about the external environment in which a body is located or one or more portions thereof. In one or more arrangements, the environment sensor(s) 234 can include one or more cameras, one or more radar sensors, one or more lidar sensors, one or more sonar sensors, and/or one or more ranging sensors. In one or more arrangements, the environment sensor(s) 234 can include one or more wind speed sensors, temperature sensors, pressure sensors, proximity sensors, flow sensors, and/or others. In one or more arrangements, the environment sensor(s) 234 can be configured to detect atmospheric phenomena that may affect the stability of the body 110 or the vehicle, such as turbulence, changes in barometric pressure, wind gusts, just to name a few possibilities. In one or more arrangements, the environment sensor(s) 234 can be configured to detect objects in the external environment. The environment sensors 234 can be any type of sensor, now known or later developed.

As noted above, the system 100 can include one or more power sources 240. The power source(s) 240 can be any power source capable of and/or configured to energize the shape memory material member(s) 130. For example, the power source(s) 240 can include one or more batteries, one or more fuel cells, one or more generators, one or more alternators, one or more solar cells, and combinations thereof. The power source(s) 240 can be a source of electrical energy.

The system 100 can include one or more input interfaces 250. An "input interface" includes any device, component, system, element or arrangement or groups thereof that enable information/data to be entered into a machine. The input interface(s) 250 can receive an input from a vehicle occupant (e.g. a driver or a passenger). Any suitable input interface 250 can be used, including, for example, a keypad, display, touch screen, multi-touch screen, button, joystick, mouse, trackball, microphone, gesture recognition (radar, lidar, camera, or ultrasound-based), and/or combinations thereof.

The system 100 can include one or more output interfaces 260. An "output interface" includes any device, component, system, element or arrangement or groups thereof that enable information/data to be presented to a user (e.g., a person) or other entity. The output interface(s) 260 can present information/data to a user or other entity. The output interface(s) 260 can include a display, an earphone, haptic device, and/or speaker. Some components of the system 100 may serve as both a component of the input interface(s) 250 and a component of the output interface(s) 260. In one or more arrangements, the input interface(s) 250 can be provided on the vehicle, or the input interface(s) 250 can be provided remote from the vehicle, such as with a remote operator of the vehicle.

The system 100 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data stores 220 may contain such instructions.

The system 100 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 100 can include one or more body control modules 270. The body control module(s) 270 can include profiles and logic for actively controlling the body 110 according to arrangements herein. The body control module(s) 270 can be configured to determine when the body 110 should be activated or deactivated. The body control module(s) 270 can be configured to do so in any suitable manner. For instance, the body control module(s) 270 can be configured to analyze data or information acquired by the sensor(s) 230 (e.g., the body sensors 232 and/or the environment sensors 234). Alternatively or additionally, the body control module(s) 270 can be configured to detect user inputs (e.g., commands) provided on the input interface(s) 250. The body control module(s) 270 can retrieve raw data from the sensor(s) 230 and/or from the data store(s) 220. The body control module(s) 270 can use profiles, parameters, or setting loaded into the body control module(s) 270 and/or stored in the data store(s) 220.

The body control module(s) 270 can analyze the sensor data to determine an appropriate action for the body 110. For instance, the body control module(s) 270 can detect changes to the body 110 and/or forces (e.g., aerodynamic forces) affecting the body. The body control module(s) 270 can be configured to determine appropriate changes to the shape, configuration, and/or morphology of the body 110 to mitigate detected changes or conditions affecting the body 110 or the vehicle overall. The body control module(s) 270 can be configured to cause one or more shape memory material members 130 associated with the body 110 to be activated or deactivated. As used herein, "cause" or "causing" means to make, force, compel, direct, command, instruct, and/or enable an event or action to occur or at least be in a state where such event or action may occur, either in a direct or indirect manner. For instance, the body control module(s) 270 can selectively permit or prevent the flow of electrical energy from the power source(s) 240 to the shape memory material member(s) 130. The body control module(s) 270 can be configured send control signals or commands over a communication network to the shape memory material member(s) 130 or other element of the system 100.

The body control module(s) 270 can be configured to cause the shape memory material member(s) 130 to be selectively activated or deactivated based on one or more activation parameters. For instance, the body control module(s) 270 can be configured to compare sensor data to one or more activation thresholds. If the threshold is met, then the body control module(s) 270 can cause one or more shape memory material members 130 to be activated or maintained in an activated condition. If the threshold is not met, then the body control module(s) 270 can cause one or more shape memory material members 130 to be deactivated or maintained in a deactivated or non-activated state.

In some instances, the body control module(s) 270 can be configured to cause the shape memory material member(s) 130 to be selectively activated or deactivated based on user inputs (e.g., commands or other inputs indicative of activating or deactivating the body 110 or shape memory material member 130). For instance, a user can provide an input on the input interface(s) 250. The input can be to activate or deactivate the shape memory material member(s) 130. The body control module(s) 270 can be configured to cause the shape memory material member(s) 130 to be deactivated or activated in accordance with the user input.

In some instances, the body control module(s) 270 can be configured to cause the shape memory material member(s) 130 to be selectively activated or deactivated based on a current operational state of the vehicle. For instance, when the vehicle is an aircraft and the aircraft is in the process of landing, the body control module(s) 270 can be configured to cause the shape memory material member(s) 130 to be selectively activated. The operational state of the vehicle may be determined based on sensor data and/or user inputs.

The body control module(s) 270 can be configured to control a plurality of shape memory material member(s) 130. The body control module(s) 270 can be configured to control each shape memory material members 130 individually. Thus, the control of one shape memory material member 130 can be independent of the control of the other shape memory material members 130. Alternatively, the body control module(s) 270 can be configured to control a plurality of shape memory material members 130 collectively. Thus, each of the plurality of shape memory material members 130 can be activated or deactivated at substantially the same time, to substantially the same degree of actuation, and/or in substantially the same manner.

The various elements of the system 100 can be communicatively linked to one another or one or more other elements through one or more communication networks 290. As used herein, the term "communicatively linked" can include direct or indirect connections through a communication channel, bus, pathway or another component or system. A "communication network" means one or more components designed to transmit and/or receive information from one source to another. The data store(s) 220 and/or one or more other elements of the system 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material member(s) 130 can be shape memory material wires. As an example, the shape memory material member(s) 130 can be shape memory alloy wire(s). Thus, when an activation input (i.e., heat) is provided to the shape memory alloy wire(s), the wire(s) can contract. The shape memory alloy wire(s) can be heated in any suitable manner, now known or later developed. For instance, the shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 90 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The wire(s) can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material member(s) 130 to go from a non-activated configuration to an activated configuration in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, Calif. As further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature TSMA. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the TSMA to a temperature greater than the TSMA.

Other active materials may be used in connected with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material member(s) 130 are described, in one implementation, as being wire(s), it will be understood that the shape memory material member(s) 130 are not limited to being wire(s). Indeed, it is envisioned that suitable shape memory materials may be employed in a variety of other forms, such as strips, small sheets or slabs, cellular and lattice structures, helical or tubular springs, braided cables, tubes, or combinations thereof. In some arrangements, the shape memory material member(s) 130 may include an insulating coating.

The shape memory material member(s) 130 can be operatively connected to the surface 120 of the body 110 in any suitable manner. In one or more arrangements, the shape memory material member(s) 130 can be constrained on the surface 120 in selected areas. "Constrained on" includes being attached to the surface so as to keep the shape memory material member(s) 130 substantially in contact with the surface 120 when activated or deactivated. Thus, in the areas in which the shape memory material member(s) 130 and constrained on the surface 120, the shape memory material member(s) 130 are restricted from separating from and/or moving away from the surface 120. As will be described in greater detail herein, such selective constraining can help to attain a desired morphed shape of the body 110.

In some arrangements, the shape memory material member(s) 130 can include a first region 150 and a second region 160. The shape memory material member(s) 130 can include a central region 170 located between the first region 150 and the second region 160. The first region 150 of the shape memory material member(s) 130 can be constrained on the surface 120, and the second region 160 of the shape memory material member(s) 130 can be constrained on the surface 120. The central region 170 of the shape memory material member(s) 130 can be unconstrained on the surface 120.

The first region 150 and the second region 160 of the shape memory material member(s) 130 can be constrained on the surface 120 in any suitable manner. The shape memory material member(s) 130 can be constrained in regions where little or no shape change of the body 110 is desired. For instance, in one or more arrangements, the first region 150 and the second region 160 of the shape memory material member(s) 130 can be constrained on the surface 120 by a plurality of stitches 140. The stitches 140 can affix the shape memory material member(s) 130 to the surface 120. The stitches 140 can restrain the shape memory material member(s) 130.

The central region 170 of the shape memory material member(s) 130 can be unconstrained. Unconstrained regions can be provided in regions where a joint and/or a shape change is desired. The shape memory material member(s) 130 are not stitched to the surface 120 in this region. Thus, a stitching gap can be formed. In the unconstrained region, the shape memory material member(s) 130 can be exposed on the surface 120 and/or generally allowed free movement relative to the surface 120.

Figure 4:
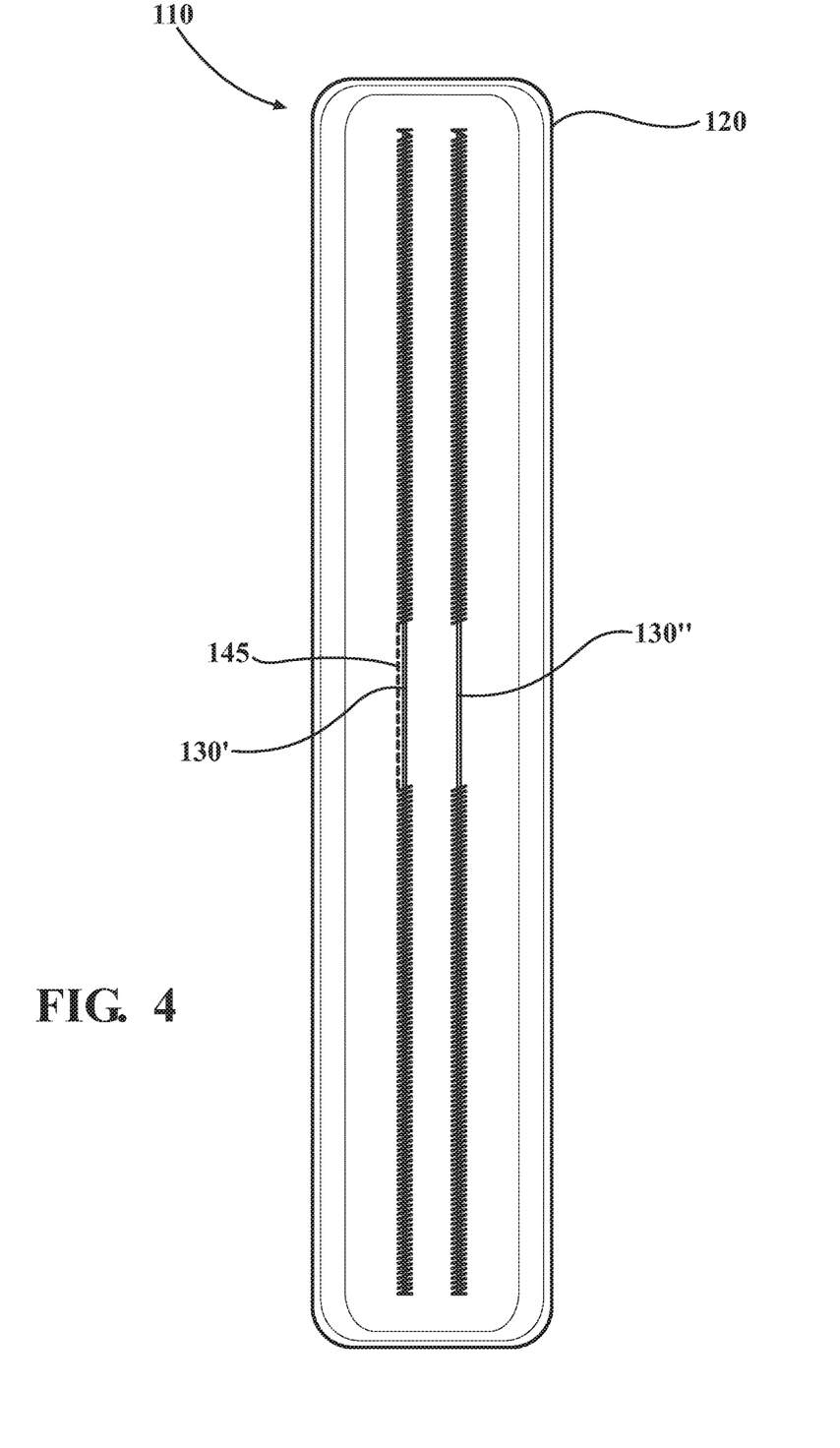
FIG. 4 is an example of a morphable body that includes a plurality of shape memory material members.

The unconstrained regions can be formed in various ways. For instance, the unconstrained regions can be formed a single continuous thread. In such case, an unstitched portion 145 (FIG. 4 and shown in dashed lines for clarity) of the thread can extend along the surface 120 from one constrained region (e.g., first region 150) to another constrained region (e.g., second region 160). One example of such an arrangement is shown in FIG. 4. However, in other arrangements, the constrained regions can be achieved using different pieces of thread. In such case, there may not be any thread in the unconstrained region.

The stitching 140 can use one or more threads. Any suitable type of thread, now know or later developed, can be used. The threads can be blended, interwoven, and/or tightly wound. Further, the threads can be composed from a variety of materials, such as natural fibers, synthetic fibers, metals, shape memory material members, shape memory alloy, or other materials capable of being formed or woven into a thread, as well as combinations thereof. Thread can be stitched using any suitable type of stitch, now known or later developed.

The regions 150, 160, 170 can have any suitable size. The first region 150 can have a first length 155, the second region 160 can have a second length 165, and the central region 170 can have a third length 175. There can be any suitable relationship between these lengths. In one or more arrangements, the first length 155 and the second length 165 can be substantially equal. In one or more arrangements, the first length 155 and the second length 165 can be different. In one or more arrangements, the first length 155 and the second length 165 can be greater than the third length 175. In one or more arrangements, the first length 155 and the second length 165 can be less than the third length 175. In one or more arrangements, the first length 155 and the second length 165 can each be at least about twice the length of the third length 175. In one or more arrangements, the first length 155, the second length 165, and the third length 175 can have a ratio of about 2:2:1.

FIG. 2 shows an arrangements in which there is only one unconstrained region of the shape memory material member 130. However, it will be appreciated that there can be a plurality of unconstrained regions of the shape memory material member 130. The plurality of unconstrained regions can be formed by providing regions of no stitching (stitching gaps) along the shape memory material member 130 between stitched regions.

While FIG. 2 shows an example of one shape memory material member 130 on the surface, it will be appreciated that there can be a plurality of shape memory material members 130 provided on the surface. In such case, the shape memory material members 130 can be substantially identical to each other. Alternatively, one or more of the shape memory material members 130 can be different from the other shape memory material members 130 in one or more respects, including, for example, material, dimensions, orientation, how constrained on the body, etc.

It will be appreciated that, when a plurality of shape memory material members 130 are used, there can be different stitching arrangements for each shape memory material member 130. As a result, different actuation configurations for the body 110 can be achieved.

When there is a plurality of shape memory material members 130, the shape memory material members 130 can have any suitable relationship with respect to each other. In one or more arrangements, the shape memory material members 130 can be substantially parallel to each other. One example of such an arrangements is shown in FIG. 4. In this example, there is a first shape memory material member 130' and a second shape memory material member 130". There can be any suitable spacing between the shape memory material members 130. In some arrangements, the shape memory material members 130 can be substantially perpendicular to each other or otherwise non-parallel. In some arrangements, the shape memory material members 130 may overlap each other.

It will be appreciated that the constrained and unconstrained regions of the shape memory material member can be used to control actuation, shapes, configuration, and/or surface features of the body 110. Thus, the shape memory material member(s) 130 can be actively controlled. For instance, when the body 110 is a wing, the body 110 can be actively controlled, such as during flight, to respond to operator desires or flight conditions, thereby facilitating flight endurance and/or aerodynamic control for an aircraft.

Figure 3A:
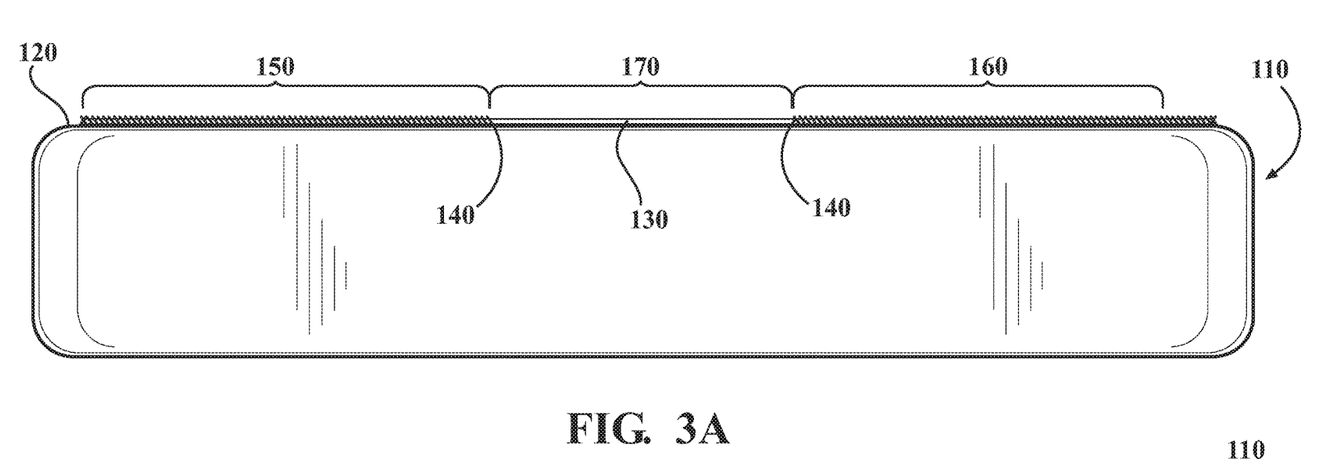
FIG. 3A is an example of the morphable body, showing a non-activated configuration.
Figure 3B:
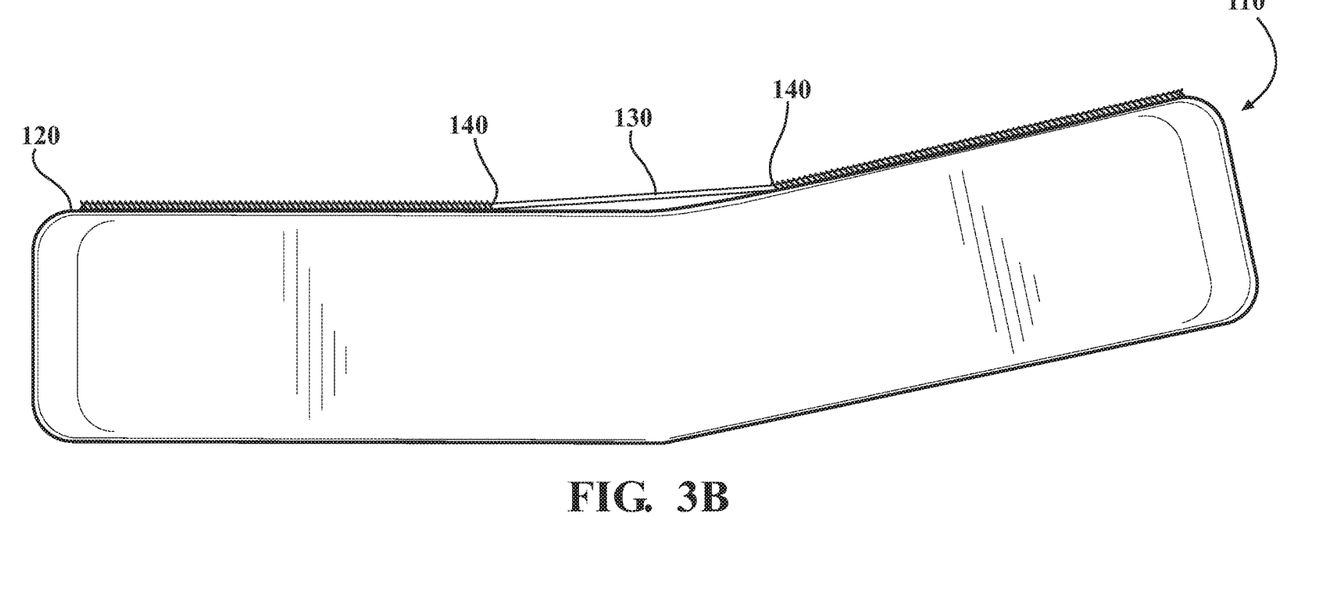
FIG. 3B is an example of the morphable body, showing an activated configuration.

The body 110 can have a non-activated configuration and one or more activated configurations. Examples of each of these configurations will be described in turn below. For instance, FIGS. 3A-3B present one example of the body 110. FIG. 3A shows an example of a non-activated configuration of the body 110. In such case, an activation input is not provided to the shape memory material member 130. For instance, when the shape memory material member 130 is a shape memory material wire, an activation input (e.g., electrical current) to heat the wires is not provided. Thus, the shape memory material member 130 in a neutral or non-activated condition. In some arrangements, in the non-activated configuration, the shape memory material member 130 can extend substantially linearly along the surface 120. However, in other arrangements, in the non-activated configuration, the shape memory material member 130 can extend in a non-linear manner overall or in one or more localized areas. It should be noted that, in this particular example, the portion of the body 110 to the left of the central region 170 can be attached, secured, and/or fixed to a surface, structure, or other element in any suitable manner (e.g., fasteners, adhesives, etc.). As an example, the portion of the body 110 to the left of the central region 170 can be attached to an aircraft structure by one or more fasteners and/or one or more adhesives. The portion of the body 110 to the right of the central region 170 is not attached, secured, and/or fixed to a surface, structure, or other element.

FIG. 3B shows an example of the body 110 in an activated configuration. It will be appreciated that FIG. 3B is merely on example of an activated configuration, as the body 110 can have a plurality of activated configurations. An activation input can be provided to the shape memory material member 130. For instance, when the shape memory material member 130 is a shape memory alloy wire, electrical current can be supplied to the wire, which causes it to heat by the Joule effect. As a result, the shape memory material member 130 can contract.

Figure 6A:
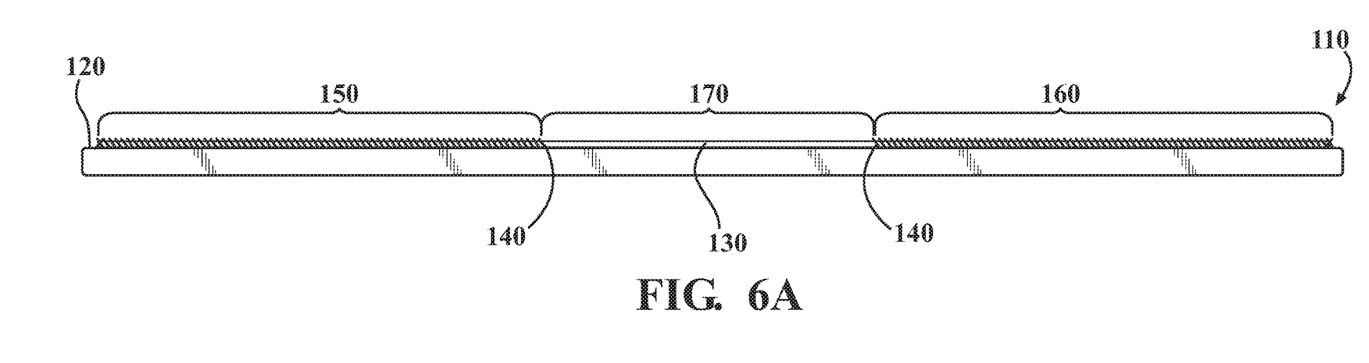
FIG. 6A is an example of a morphable body, showing a non-activated configuration.
Figure 6B:
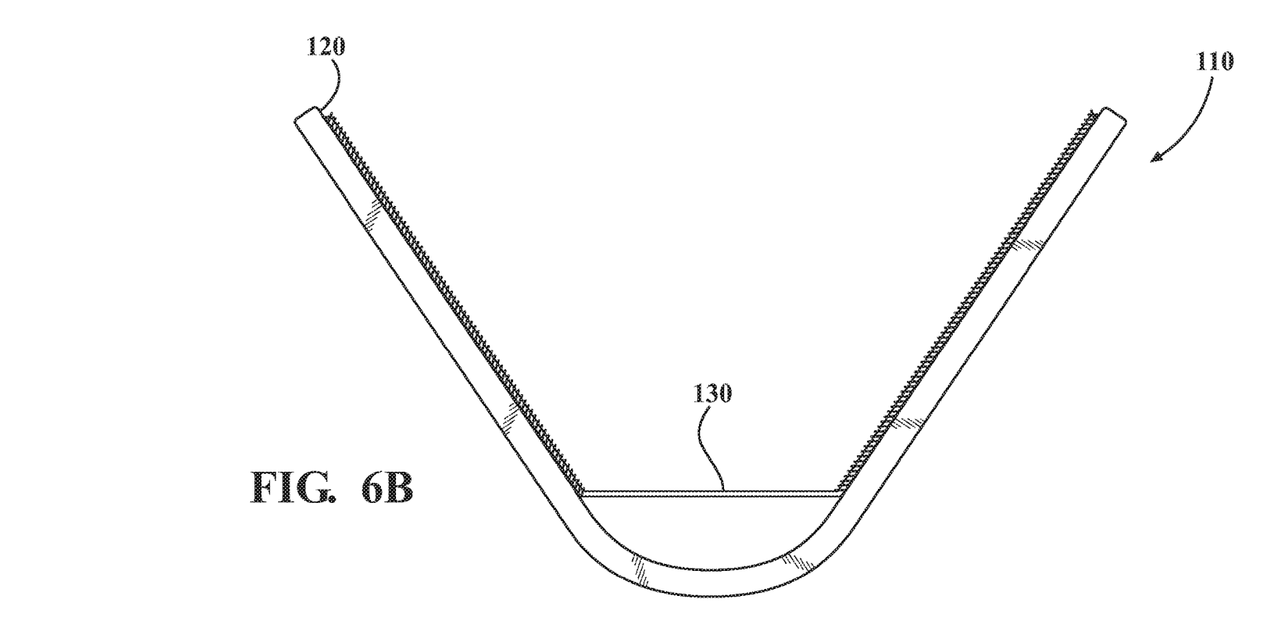
FIG. 6B is an example of the morphable body, showing an activated configuration.

In the constrained regions, the shape memory material member 130 can remain substantially in contact with the surface 120 due to the stitches 140. The central region of the shape memory material member 130 is unconstrained. Due to the portion of the body 110 to the left of the central region being attached, secured, and/or fixed, this portion of the body 110 does not substantially move. However, the portion of the body 110 to the right of the central region 170 is not attached, secured, and/or fixed. Therefore, the contracting shape memory material member 130 can pull the portion of the body 110 to the right of the central region 170 toward the portion of the body 110 to the left of the central region 170. As a result, the body 110 can bend in the unconstrained region. The bending angle can be configured as desired. In some arrangements, the bending angle can be an acute angle or an obtuse angle. In some arrangements, the bending angle can be about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 25 degrees, about 20 degrees, about 15 degrees, about 10 degrees, or about 0 degrees, FIGS. 6A and 6B show further examples of a non-activated and an activated configuration for the body 110. In these examples, the body 110 can have a similar shape memory member 130 and stitches 140 as in FIGS. 3A-3B. However, neither of the portions of the body 110 outboard of the central region 170 are attached, secured, and/or fixed to a surface, structure, or other element. FIG. 6A shows the body 110 in a non-activated configuration.

When an activation input is provided to the shape memory material member 130, the body 110 can morph into the activated configuration shown in FIG. 6B. For instance, when the shape memory material member 130 is a shape memory alloy (SMA) wire, electrical current can be supplied to the wire, which causes it to heat by the Joule effect. As a result, the shape memory material member 130 can contract. In the first and second regions 150, 160 where the shape memory material member 130 is constrained, the shape memory material member 130 can remain substantially in contact with the surface 120 due to the stitches 140. The central region 170 of the shape memory material member 130 is unconstrained. As a result, the portions of the body 110 outboard of the central region 170 can be drawn toward each other, causing the body 110 to bend in the central region 170. Thus, it will be appreciated that different activation profiles for the body 110 can be achieved.

In some arrangements, the shape memory material member 130 can be attached to the surface 120 at or near its ends. In such case, the constrained regions can be very small at each end of the shape memory material member 130. However, the unconstrained region can be relatively large. As a result, there can be a large deformation of the body 110 when the shape memory material member 130 is activated.

Now that the various potential systems, devices, elements and/or components of the system 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 5:
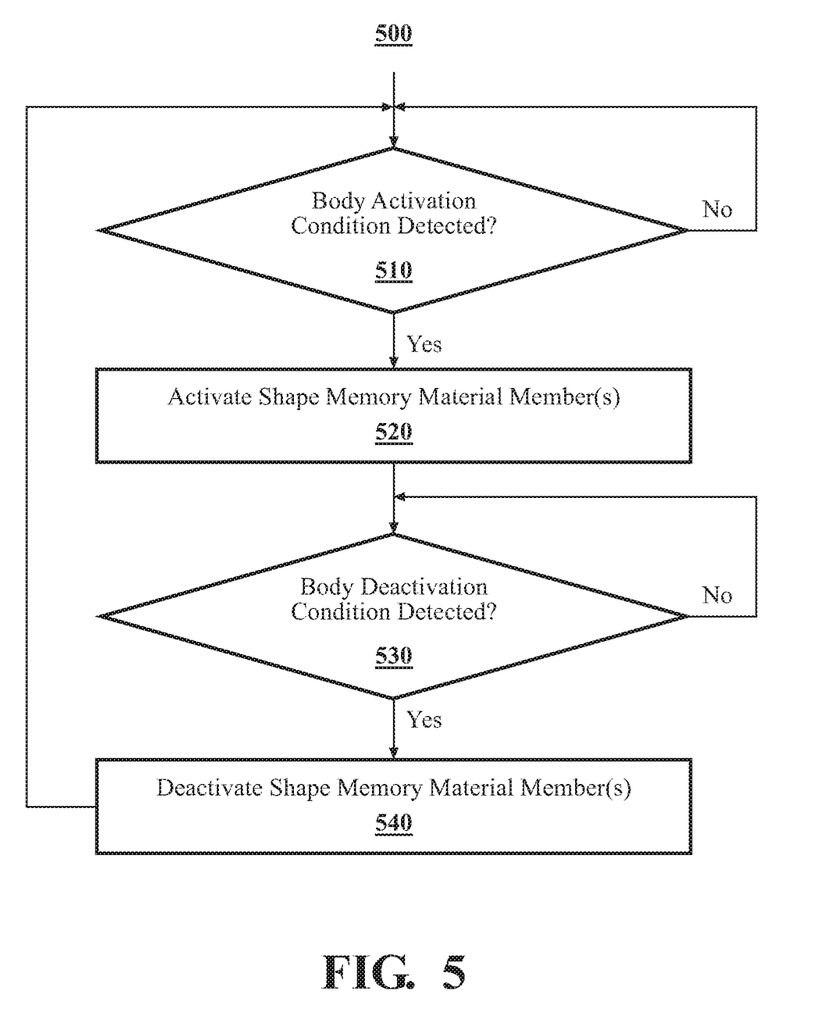
FIG. 5 is an example of a method of morphing a body.

Turning to FIG. 5, an example of a method 500 is shown. For the sake of discussion, the method 500 can begin with the shape memory material member(s) 130 in a non-activated mode. In the non-activated mode, electrical energy from the power source(s) 240 is not supplied to the shape memory material member(s) 130. The body 110 can be in a non-activated configuration, such as is shown in FIG. 3A or 6A.

At block 510, it can be determined whether a body activation condition has been detected. The body activation condition may be detected by the body control module(s) 270, the processor(s) 210, and/or one or more sensor(s) 230. For instance, the body control module(s) 270, the processor(s) 210, and/or one or more sensor(s) 230 can determine that data acquired by the body sensor(s) 232 meets a seat activation condition. For instance, the body control module(s) 270, the processor(s) 210, and/or one or more sensor(s) 230 can determine whether the sensor data acquired by the sensor(s) 230 (e.g., data/information about the body 110, the vehicle, or the environment of the body/vehicle, etc.) meets a respective body activation threshold. Alternatively or in addition, the body control module(s) 270, the processor(s) 210, and/or one or more sensor(s) 230 can detect a user input indicating that the body 110 should be activated. The user input can be provided via the input interface(s) 250.

If a body activation condition is not detected, the method 500 can end, return to block 510, or proceed to some other block. However, if a body activation condition is detected, then the method can proceed to block 520. At block 520, the shape memory material member(s) 130 can be activated. Of course, the body control module(s) 270 and/or the processor(s) 210 may only actuate certain individual shape memory material member(s) 130 while leaving others in a non-activated state. Thus, the body control module(s) 270 and/or the processor(s) 210 can cause or allow the flow of electrical energy from the power sources(s) 240 to the shape memory material member(s) 130.

When activated, the shape memory material member(s) 130 can contract. The contraction of the shape memory material member(s) 130, along with the constraint of the shape memory material member(s) 130 in certain locations, can cause the body 110 to morph into an activated configuration. Examples of the activated configurations are shown in FIG. 3B or 6B. The method can continue to block 530.

At block 530, it can be determined whether a body deactivation condition has been detected. The body deactivation condition may be detected by the body control module(s) 270, such as based on data acquired by the sensor(s) 230 and/or by detecting a user input or the cessation of a user input. If a seat deactivation condition is not detected, the method 500 can return to block 530, or proceed to some other block. However, if a deactivation condition is detected, then the method can proceed to block 540. At block 540, the shape memory material member(s) 130 can be deactivated. Thus, the body control module(s) 270 and/or the processor(s) 210 can cause the flow of electrical energy from the power sources(s) 240 to the shape memory material member(s) 130 to be discontinued. As a result, the shape memory material member(s) 130 can expand and can substantially return to a non-activated configurations. Consequently, the body 110 can substantially return to the non-activated configuration.

The method 500 can end. Alternatively, the method 500 can return to block 510 or some other block.

Arrangements described herein can be used in various applications. For example, in one or more arrangements, the body 110 can be a wing of an aircraft. Arrangements described herein can be implemented to contort the shape, angle, and/or configuration of the wing. Arrangements described herein can assist with the deployment and/or retraction of portions of the wing. Control systems can be implemented to allow for automatic shape change in the wing response to changing wind conditions, and/or wing retraction for controlled descent.

It will be appreciated that arrangements described herein can provide numerous benefits, including one or more of the benefits mentioned herein. For example, arrangements described herein can provide for remote and/or automated control of the shape/morphology of a body, such as an inflated wing during flight. Shape control system and arrangements described herein are very light and add negligible weight to the body. Arrangements described herein can make use of existing power sources, or a small power source can be added. Compared to systems that use a motor, arrangements described here are much lighter and better suited for flight. Arrangements described herein can enable large and quick changes in shape, configuration, or morphology of a body based on real-time changes to the body, the vehicle that it is a part of, and/or conditions of the operational environment. Arrangements described herein can allow the breaking stress to be controlled by changing the thread.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A morphable structure comprising:
   a body, at least a portion of the body being hollow, the body including a surface; and
   a shape memory material member extending along the surface, the shape memory material member including a first region and a second region, the shape memory material member including a central region located between the first region and the second region,
   the shape memory material member being constrained on the surface in the first region by stitches, the shape memory material member being constrained on the surface in the second region by stitches, the central region of the shape memory material member being unconstrained on the surface,
   when activated, the shape memory material member causes the body to bend in the central region, whereby the body is morphed into an activated configuration.

2. The morphable structure of claim 1, wherein the shape memory material member is a shape memory alloy wire.

3. The morphable structure of claim 1, wherein the surface is an external surface of the body.

4. The morphable structure of claim 1, wherein the body is configured to be inflatable.

5. The morphable structure of claim 1, wherein the first region has a first length, wherein the second region has a second length, wherein the central region has a third length, and wherein the first length and the second length is greater than the third length.

6. A system for morphing a body, the system comprising:
a body, the body including a surface;
a shape memory material member extending along the surface, the shape memory material member including a first region and a second region, the shape memory material member including a central region located between the first region and the second region, the first region and in the second region of the shape memory material member being constrained on the surface by stitches, the central region of the shape memory material member being unconstrained on the surface;
one or more power sources operatively connected to the shape memory material member; and
one or more processors operatively connected to control a supply of electrical energy from the one or more power sources to the shape memory material member, the one or more processors being programmed to initiate executable operations comprising:
   determining whether a morphing condition is met; and
   responsive to determining that the morphing condition is met, causing electrical energy to be supplied to the shape memory material member from the one or more power sources, whereby the shape memory material member is activated to cause the body to bend in the central region, whereby the body is morphed into an activated configuration.

7. The system of claim 6, wherein the body is a vehicle component.

8. The system of claim 6, wherein the body is configured to be inflatable.

9. The system of claim 6, wherein the shape memory material member is a shape memory alloy wire.

10. The system of claim 6, further including one or more sensors operatively connected to the one or more processors, wherein the one or more sensors are configured to acquire sensor data about an external environment of the body, and wherein determining whether a morphing condition is met includes comparing acquired sensor data about the external environment of the body to a morphing condition threshold.

11. The system of claim 6, further including one or more sensors operatively connected to the one or more processors, and wherein the one or more sensors are configured to acquire sensor data about the body, and wherein determining whether a morphing condition is met includes comparing acquired sensor data about the body to a morphing condition threshold.

12. The system of claim 6, further including an input interface operatively connected to the one or more processors, and wherein determining whether a morphing condition is met includes receiving a user input on the input interface indicative of morphing the body.

13. The system of claim 6, wherein the shape memory material member is a first shape memory material member, and further including a second shape memory material member extending along the surface, the second shape memory material member including a first region and a second region, the second shape memory material member including a central region located between the first region and the second region, the second shape memory material member being constrained on the surface in the first region and in the second region by stitches, the second shape memory material member being unconstrained on the surface in the central region.

14. A method of morphing a body, the body including a surface, a shape memory material member extending along the surface, the shape memory material member including a first region and a second region, the shape memory material member including a central region located between the first region and the second region, the first region and in the second region of the shape memory material member being constrained the surface by stitches, the central region of the shape memory material member being unconstrained on the surface, the method comprising:
   determining, using one or more processors, whether a morphing condition is met; and
   responsive to determining that the morphing condition is met, causing, using one or more processors, electrical energy to be supplied to the shape memory material member such that the shape memory material member contracts and causes the body to bend in the central region, whereby the body is morphed into an activated configuration.

15. The method of claim 14, wherein determining whether a morphing condition is met includes comparing sensor data about an external environment of the body to a morphing condition threshold.

16. The method of claim 14, wherein determining whether a morphing condition is met includes comparing sensor data about the body to a morphing condition threshold.

17. The method of claim 14, wherein determining whether a morphing condition is met includes determining whether a user input provided on a user input interface is an input indicative of morphing the body.

18. The method of claim 14, wherein the shape memory material member is a shape memory alloy wire.

19. The method of claim 14, further including:
detecting a morphing deactivation condition; and
responsive to detecting the morphing deactivation condition, causing the supply of electrical energy to the shape memory material member to be discontinued, whereby the shape memory material member substantially returns to a non-activated configuration.

* * * * *